(12) United States Patent
Fan et al.

(10) Patent No.: US 8,164,040 B2
(45) Date of Patent: Apr. 24, 2012

(54) SATURATION OPTICS

(75) Inventors: Regis S. Fan, Westminster, CO (US); Edward R Dowski, Jr., Lafayette, CO (US); Kenneth S. Kubala, Boulder, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 579 days.

(21) Appl. No.: 12/376,540

(22) PCT Filed: May 23, 2007

(86) PCT No.: PCT/US2007/069573
§ 371 (c)(1),
(2), (4) Date: Jun. 3, 2009

(87) PCT Pub. No.: WO2007/137293
PCT Pub. Date: Nov. 29, 2007

(65) Prior Publication Data
US 2010/0012866 A1    Jan. 21, 2010

Related U.S. Application Data

(60) Provisional application No. 60/802,724, filed on May 23, 2006, provisional application No. 60/808,790, filed on May 26, 2006.

(30) Foreign Application Priority Data

May 23, 2007  (WO) ................ PCT/US2007/069573

(51) Int. Cl.
*G01J 1/04*    (2006.01)
*G01J 1/42*    (2006.01)

(52) U.S. Cl. ..................................... 250/216; 250/201.1
(58) Field of Classification Search .................. 250/568, 250/216, 201.1, 229; 359/721
See application file for complete search history.

(56) References Cited

U.S. PATENT DOCUMENTS

| | | | |
|---|---|---|---|
| 4,300,167 A * | 11/1981 | Miller et al. .................. 348/356 |
| 4,523,809 A | 6/1985 | Taboada et al. |
| 5,748,371 A | 5/1998 | Cathey, Jr. |
| 7,379,613 B2 | 5/2008 | Dowski, Jr. |
| 2003/0122926 A1 | 7/2003 | Kumei et al. |

FOREIGN PATENT DOCUMENTS

EP        0403467 A      12/1990

OTHER PUBLICATIONS

International Search Report and Written Opinion issued in related PCT Patent Application Serial No. PCT/US2007/069573 dated Feb. 7, 2008, 16 pages.

(Continued)

*Primary Examiner* — Tony Ko
(74) *Attorney, Agent, or Firm* — Lathrop & Gage LLP

(57) ABSTRACT

An imaging system includes a detector for receiving electromagnetic energy and generating sampled data in accordance with the electromagnetic energy so received. The detector is characterized by a threshold point such that the sampled data is in one of two states: i) below threshold, when the intensity of the electromagnetic energy so received is less than the threshold point; and ii) above threshold, when the intensity of the electromagnetic energy is greater than the threshold point. The imaging system also includes saturation optics for providing a characteristic of the sampled data, wherein the characteristic of the sampled data when below threshold is different from the characteristic of the sampled data when above threshold.

33 Claims, 16 Drawing Sheets

OTHER PUBLICATIONS

Response to Written Opinion filed in related PCT Patent Application Serial No. PCT/US2007/069573 dated May 7, 2008, 16 pages.

European Patent Application No. 07 797 693.4 Communication pursuant to Article 94(3) EPC, Apr. 1, 2009, 4 pages.

European Patent Application No. 07 797 693.4 Response to Communication pursuant to Article 94(3) EPC, Jul. 29, 2009, 17 pages.

European Patent Application No. 07 797 693.4 Communication pursuant to Article 71(3) EPC (Intention to Grant), Oct. 7, 2009, 46 pages.

Chinese Application No. 200780018200.8, Notification of First Office Action, Mar. 11, 2010, 9 pages.

Chinese Application No. 200780018200.8, Response to Office Action, Jul. 12, 2010, 12 pages.

* cited by examiner

SATURATION OPTICS

CROSS-REFERENCE TO RELATED APPLICATIONS

This application claims priority to U.S. provisional patent application Ser. No. 60/802,724, filed May 23, 2006, entitled SATURATION OPTICS; U.S. provisional patent application Ser. No. 60/808,790, filed May 26, 2006, entitled SATURATION OPTICS; and PCT patent application serial number PCT/US07/09347, entitled ARRAYED IMAGING SYSTEMS AND ASSOCIATED METHODS, filed on Apr. 17, 2007, all of which applications are incorporated herein by reference in their entireties.

U.S. patent application Ser. No. 10/376,924, filed Feb. 27, 2003 and entitled OPTIMIZED IMAGE PROCESSING FOR WAVEFRONT CODED IMAGING SYSTEMS, is expressly incorporated herein by reference in its entirety.

BACKGROUND

In typical imaging situations, an imaging system is designed for best performance and production of sufficient quality images for average expected lighting conditions. Images may be collected from a large variety of conditions and locales; indoor scenes with artificial lighting, such as incandescent or fluorescent lighting, may vary significantly from outdoor scenes under bright sunlight.

Composite lighting conditions, mixing indoor and outdoor lighting characteristics, are also possible. For example, the imaging system may be located inside of a building while imaging a scene that includes poorly illuminated dark-colored objects within the building as well as brightly sunlit light-colored objects outside of the building. Such a combined indoor and outdoor scene may require imaging of a set of objects that range in intensity over multiple orders of magnitude.

Intensity of a scene or an object may be formally characterized by measuring the luminance of specific objects within the scene. Luminance is defined as the number of candelas per square meter ("$cd/m^2$"). For instance, a dark wooden surface may have a luminance of less than 1 $cd/m^2$, a light colored wall may have a luminance of approximately 10 $cd/m^2$, a concrete parking lot may have a luminance of approximately 1,000 $cd/m^2$ and the sky may have a luminance of greater than 10,000 $Cd/m^2$.

SUMMARY

In one embodiment, an imaging system for imaging electromagnetic energy is disclosed. The imaging system includes a detector for receiving the electromagnetic energy and generating sampled data in accordance with the electromagnetic energy so received. The detector is characterized by a threshold point such that the sampled data is in one of two states: i) below threshold, wherein the intensity of the electromagnetic energy so received is less than the threshold point; and ii) above threshold, wherein the intensity of the electromagnetic energy is greater than the threshold point. The imaging system also includes saturation optics for providing a characteristic of the sampled data, wherein the characteristic of the sampled data below threshold is different from the characteristic of the sampled data above threshold. In a further embodiment, the saturation optics includes imaging optics for directing the electromagnetic energy toward the detector and phase modifying optics for modifying a wavefront of the electromagnetic energy. In another embodiment, the saturation optics include an arrangement of segments providing multi-fold symmetry.

In one embodiment, phase modifying optics for use in an imaging system include a constant profile path surface including a plurality of segments, each of the plurality of segments including a surface sag defined by a one dimensional function along a straight line perpendicular to a radial vector from a center of the phase modifying optics.

In one embodiment, a method for designing a pupil function for use in an imaging system is disclosed. The method includes selecting a pupil function and calculating a sampled PSF, taking into account characteristics of the imaging system and the pupil function. The method further includes evaluating the sampled PSF in accordance with a selected metric and, if the sampled PSF does not conform within the selected metric, then modifying the pupil function, using a set of parameter modifications, and repeating the evaluating and modifying of the pupil function until the sampled PSF conforms within the selected metric.

BRIEF DESCRIPTION OF THE DRAWINGS

It is noted that, for purposes of illustrative clarity, certain elements in the drawings may not be drawn to scale. It is also noted that, for purposes of illustrative clarity and reproduction compatibility, certain images may be, without loss of generality, simplified and contrast enhanced.

DETAILED DESCRIPTION OF THE DRAWINGS

As lighting conditions vary, the performance of an imaging system is affected; therefore we now disclose, among other features, design and implementation of imaging systems that function in a certain manner when the illumination intensity of the electromagnetic energy is sufficiently high to saturate the detector. Two examples of high and low illumination intensity conditions are: 1) high illumination that saturates a detector and low illumination that does not saturate a detector; and 2) high illumination that does not quite saturate the detector but the low and high illumination intensities are sufficiently different as to be discernable in the presence of noise. The second definition is for example useful in connection with binary or thresholded digital images; that is, when considering relative illumination intensities that are below a saturation point of the detector, a distinguishing level between low and high illumination intensities may be defined as a value at which an appropriate thresholding may be determined.

For example, for an eight-bit detector providing electronic data, a low illumination intensity may mean unsaturated 0 to 254 counts and a high illumination intensity may mean 255 or more counts; that is, for the exemplary eight-bit detector, the value of 255 counts may be denoted as the saturation point of the detector. Alternatively, for the same eight-bit detector, illumination levels corresponding to 10 and 100 counts may be considered low and high respectively in the presence of a noise level that is less than 90 counts such that the difference in these illumination levels is discernable.

Figure 25:
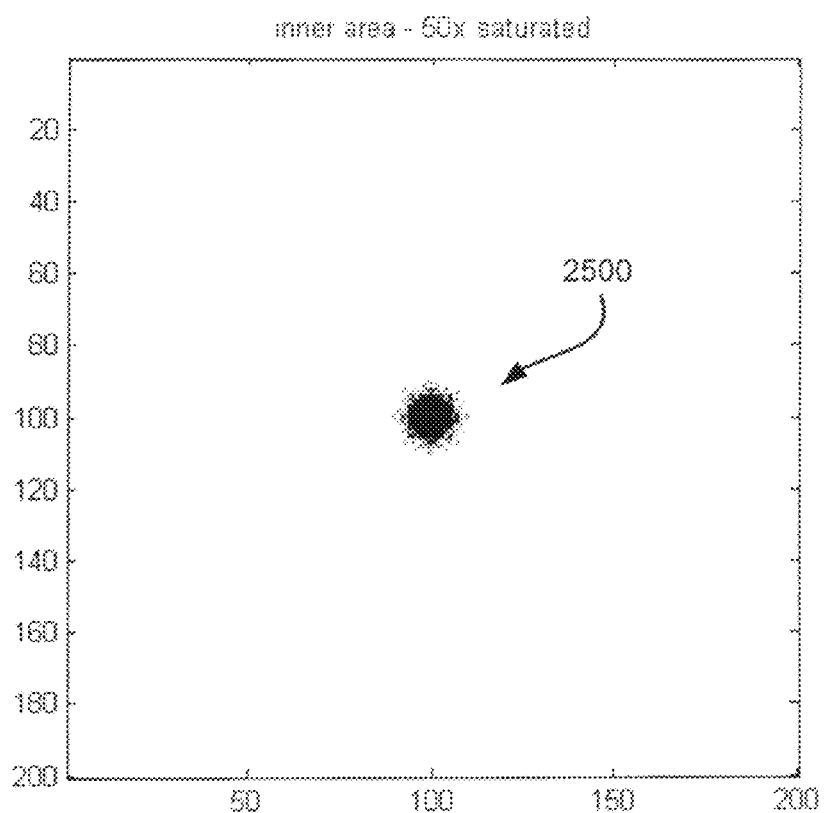
FIG. 25 shows a plot of a saturated sampled PSF obtained with an imaging system including the selected inner region of the pupil function as shown in FIG. 23.

Saturation of a detector occurs, for example, when the dynamic range of an imaged scene is greater than the dynamic range of the detector. For the exemplary eight-bit detector, for example, a dark wooden surface (less than 1 cd/m$^2$) and a light colored wall (~10 cd/m$^2$) may not saturate the detector, whereas a parking lot (~1,000 cd/m$^2$) and sky (greater than 10,000 cd/m$^2$) may saturate the detector. The aforementioned object intensities assume that the exemplary detector has a saturation point at a luminance of, for example, 20 cd/m$^2$. Exemplary saturated sampled PSFs described herein are associated with a saturation level. For example, sampled PSF 2500 of FIG. 25 is noted as being 50× saturated. Therefore, PSF 2500 may be associated with an intensity of 1000 cd/m$^2$ incident upon the detector.

Other than for normal imaging, saturation of a detector may occur in artistic imaging situations or to probe the response of the detector or optics. Artistic imaging may include the use of structured illumination sources, specialized flash lighting and/or extended exposure. Probing may use high intensity incoherent or coherent sources. Probing may be used to determine, for instance, the identification of the detector or for detection of the detector in military applications. Herein, imaging optics specially designed for high dynamic range intensity imaging conditions are referred to as "saturation optics." In other words, an imaging system including saturation optics is one designed such that an image formed by the imaging system of an object may be tailored as a function of, for example, the illumination intensity of the object. The saturation optics includes a specially-designed pupil function such that the imaging system including the saturation optics behaves in a predetermined way under saturated imaging conditions.

Saturation optics may additionally include imaging optics and/or phase modifying optics for coding a wavefront of electromagnetic energy transmitted therethrough, such as described in U.S. Pat. No. 5,748,371, which is included herein by reference. In certain applications, phase modifying optics may include non-rotationally symmetric optics. Particularly when forming images of distant points with high illumination intensity, phase modifying optics may produce images that are perceived to be very different from those produced by an imaging system including only rotationally symmetric optics (i.e., a "traditional" imaging system without the phase modifying optics).

The use of saturation optics in an imaging system may provide certain benefits. For example, an imaging system including saturation optics combined with phase modifying optics may be configured to produce images that appear to have been generated by traditional imaging systems but with added advantages, such as reduced aberrations and/or extended depth of field. Saturation optics may also be used in imaging systems to produce images that appear to have been produced by non-traditional imaging systems with certain identifiable characteristics (e.g., digital watermarking) that provide indicators of the optics used in the imaging system. An additional consideration is that off-axis saturated images formed by a traditional imaging system, when saturated, may exhibit undesirable effects such as, for example, vignetting when an aperture stop is placed against an optical element in the traditional imaging system. In practice, the aperture stop has a finite thickness such that different field positions will overlap in different physical positions, thereby creating an asymmetric saturated response that may reduce the image quality. The use of saturation optics may thus alleviate such problems.

Herein, many of the embodiments are described in association with images of points or point objects or, alternatively, PSFs. Within the context of the present description, such descriptions are considered interchangeable. It is further recognized that any object may be decomposed into a set of point objects and its image may be decomposed into an associated set of PSFs.

In the context of the present disclosure, a distinction is made between a PSF in a conventional sense, which is a function of the optics of an imaging system, and a "sampled PSF", which refers to a PSF as captured by a detector. That is, a sampled PSF is a PSF modified by certain characteristics of a detector in the imaging system such as, but not limited to, sampling patterns, pixilation, wavelength selection and saturation. The characteristics of a sampled PSF are directly related to the design of an imaging system as well as the incident electromagnetic energy distribution imaged by the imaging system. Characteristics of a sampled PSF include any discernable feature used to describe the shape and form of a sampled PSF such as, but not limited to contours, outlines, footprints, spatial extents, profiles, cross-sections, pixel values, orientation, gradients, intensities and location within an image.

Moreover, a sampled PSF may be further classified as either a saturated sampled PSF, when the intensity of illumination is sufficient to saturate a portion of the detector, or an unsaturated sampled PSF, when the detector is unsaturated. An associated set of PSFs from an image may also be modified by the aforementioned characteristics of a detector in the imaging system and, when the detector is saturated, result in a sampled image with saturated sampled PSF or, more concisely, a "saturated sampled image."

Figure 1:
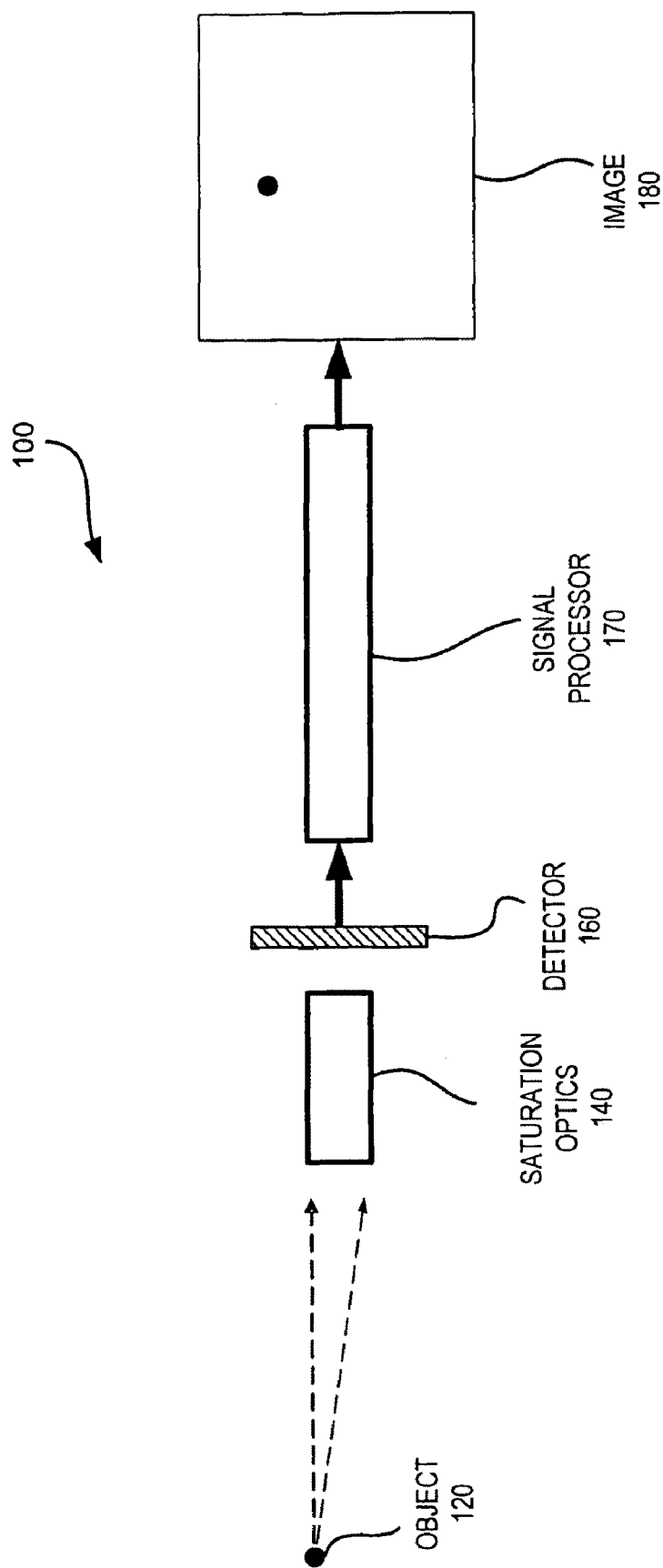
FIG. 1 is a schematic diagram of an imaging system including saturation optics, shown here to illustrate a response of the imaging system to non-saturating illumination, according to an embodiment.

FIG. 1 is a schematic diagram of an imaging system 100 including saturation optics, shown here to illustrate a response of a detector in the imaging system to non-saturating illumination with a low illumination level, in accordance with an embodiment. Imaging system 100 images a small, off-axis object 120 that is not reflecting or radiating enough electromagnetic energy to saturate the detector. Imaging system 100 also includes saturation optics 140 for imaging object 120 at a detector 160 (e.g., film, CCD, CMOS detector or microbolometer). Saturation optics 140 may include imaging optics and phase modifying optics that have been designed to accommodate saturation conditions, as discussed in more detail below. Detector 160 and an optional, signal processor 170 cooperate to generate electronic data that may be used to form an image 180. If object 120 is sufficiently small, then image 180 may be considered a sampled PSF for imaging system 100. Under unsaturated conditions, image 180 is similar to that expected from a conventional imaging system; that is, image 180 includes a shape 120' resembling object 120. Signal processor 170 may further process image 180 by application of techniques such as, but not limited to, filtering, scaling and color correction.

Figure 2:
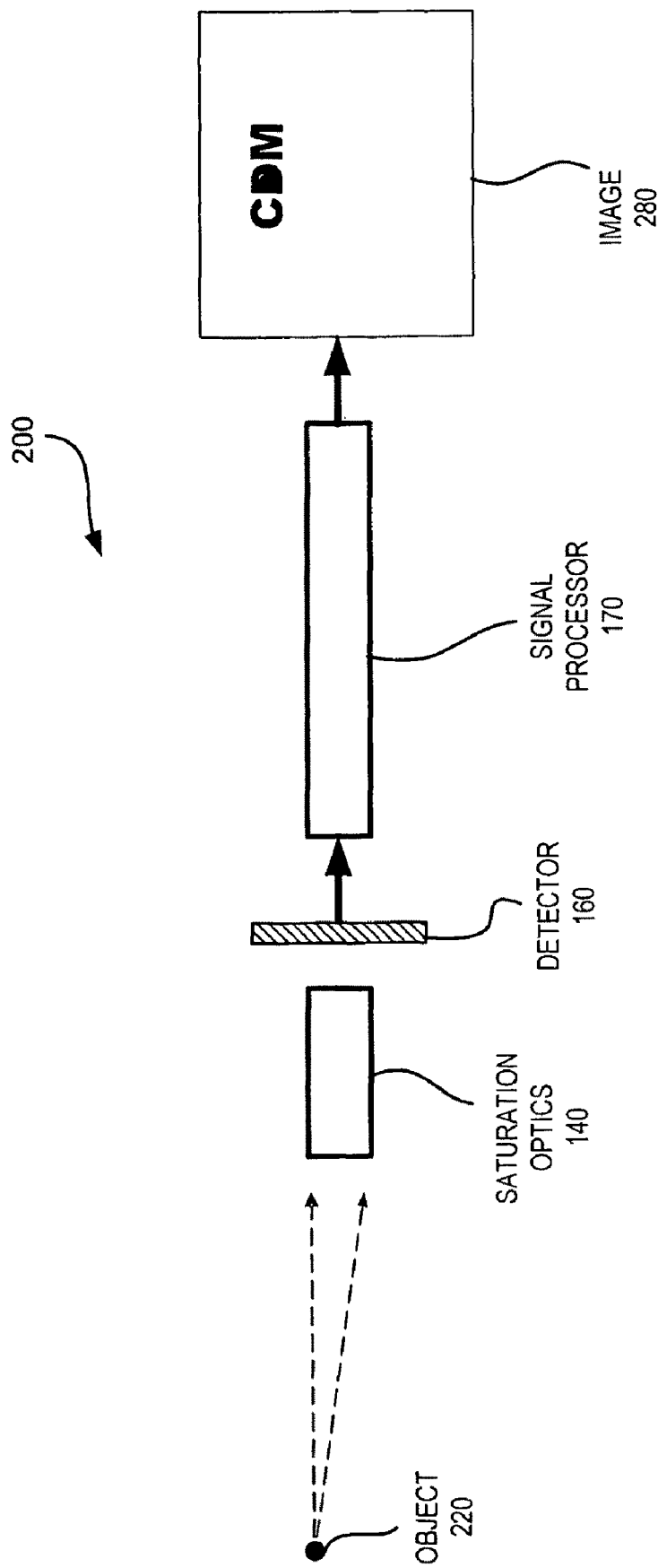
FIG. 2 is a schematic diagram of the imaging system including saturation optics, shown here to illustrate a response of the imaging system to saturating illumination, according to an embodiment.

FIG. 2 is a schematic diagram of an imaging system 200 with saturation optics, shown here to illustrate a response of the imaging system to saturating illumination with a high illumination level. The components of imaging system 200 are essentially unchanged from those of imaging system 100, with the exception that imaging system 200 is being used to image a high intensity object 220. The illumination level of high intensity object 220 is large enough so that a saturated sampled image 280 results. Saturation optics 140 and detector 160, optionally in combination with signal processor 170, generate electronic data corresponding to saturated sampled image 280 that may exhibit different characteristics from unsaturated sampled image 180, FIG. 1, or from a saturated sampled image-captured by a traditional imaging system without saturation optics. In the exemplary case shown in FIG. 2, saturated sampled image 280 is a superposition of a formed image representing text "CDM" and image 180 (note that a dot similar to that in image 180 is located in the center of the "D" in saturated sampled image 280). The formed image is produced by saturation optics 140 under saturated imaging conditions. Such a formed image may be used, for instance, as a digital watermark for use in identification of a given imaging system under specific lighting conditions; that is, illumination level may be used to identify a particular imaging system.

Image 280 may be distributed over a large portion of detector 160 and approximate a sampled PSF formed by a traditional imaging system including, for instance, circularly symmetric optics. As may be seen by comparing image 180 with saturated sampled image 280, it may be seen that the use of saturation optics 140 results in identifiably different sampled images depending only on the illumination intensity of the object. Saturation optics 140 may also be characterized by a defined field of view such that the characteristics of a sampled PSF corresponding to saturated sampled image 280 may depend upon the location of object 220 within the field of view. Additionally, the pupil function of saturation optics 140 may be further configured such that imaging an object located outside of the field of view may result in a sampled image with still different characteristics. Optionally, saturation optics 140 may be designed such that characteristics of the sampled image, or a portion thereof, is a function of one or more of the range, field angle object, volumetric location, shape, illumination intensity and color.

Figure 3:
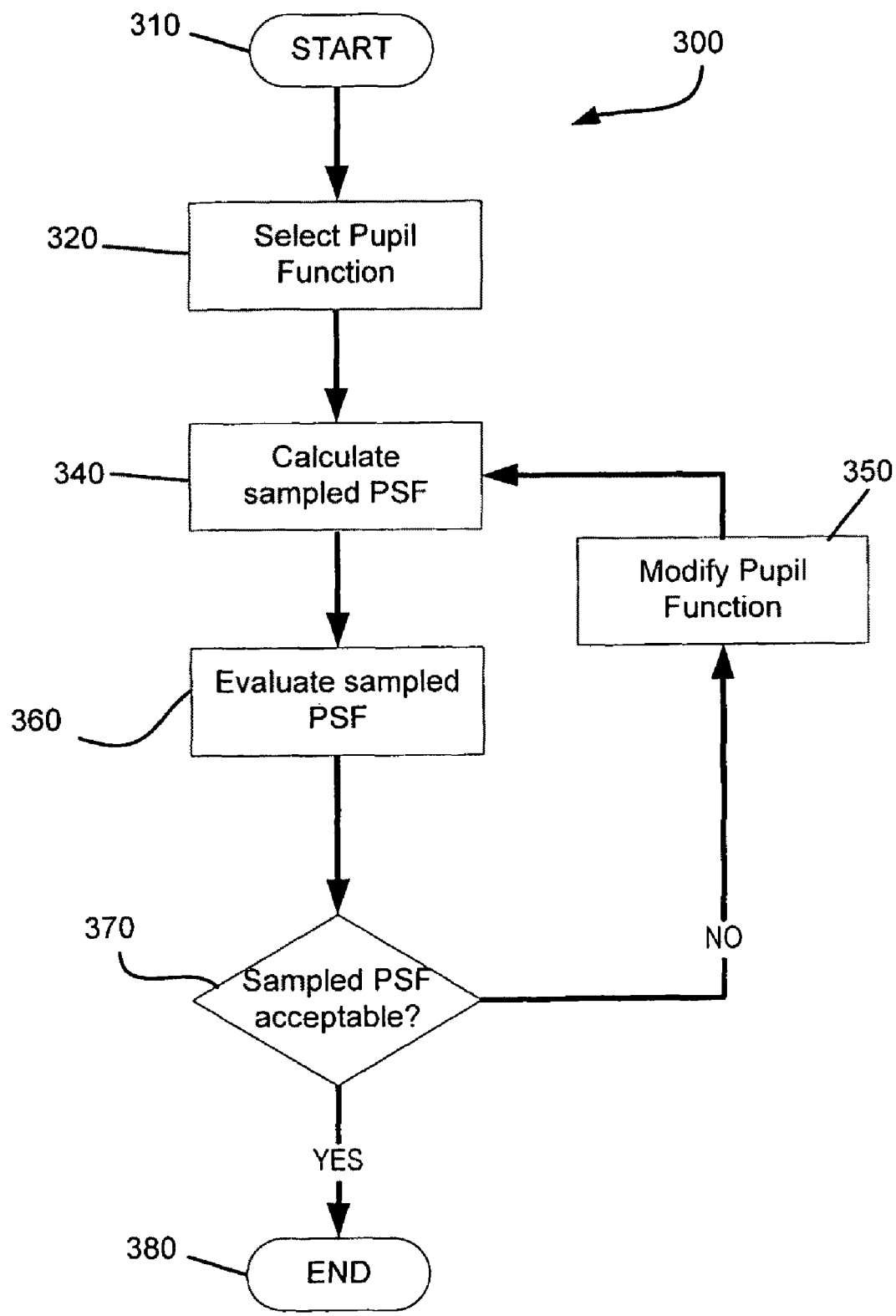
FIG. 3 is a flowchart for a process of designing a pupil function for saturation optics, according to an embodiment.

A flowchart for a process 300 of designing a pupil function for saturation optics is shown in FIG. 3. Process 300 may rely upon certain a priori knowledge, such as known diffraction effects at the edge of the pupil, artifacts that may be caused by phase discontinuities and symmetries to be used in the design of the saturation optics.

Figure 34:
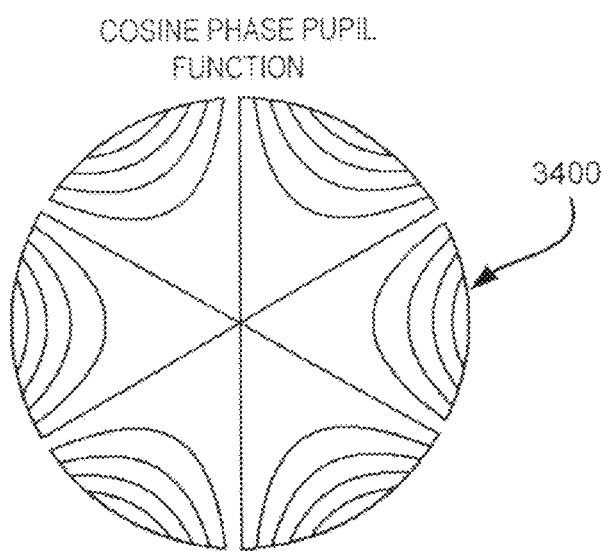
FIG. 34 shows a contour plot of a cosine phase pupil function, according to an embodiment.
Figure 35:
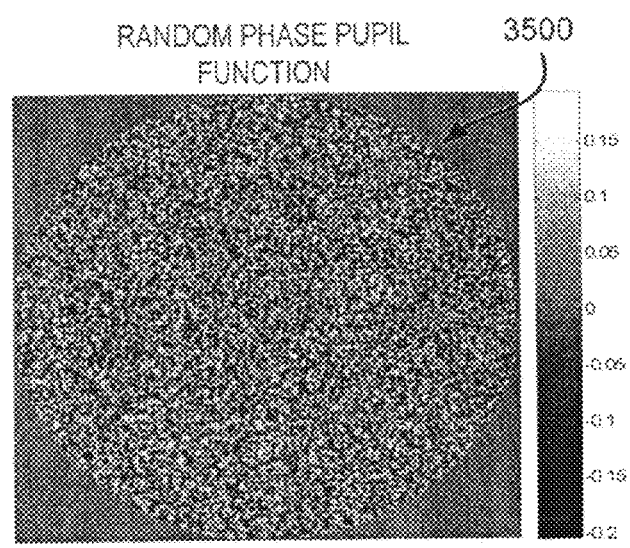
FIG. 35 shows a grayscale image of a random phase pupil function, according to an embodiment.

Process 300 begins with a START step 310, followed by a step 320 to select one or more pupil functions as an initial guess for the design. For example, pupil functions 900 of FIG. 9, 1000 of FIG. 10, 3400 of FIG. 34 and 3500 of FIG. 35 are suitable for selection in step 320. Once a pupil function has been selected as the initial guess, process 300 advances to a step 340, in which the sampled PSF corresponding to the selected pupil function(s) is calculated, taking into account characteristics of the optical elements to be used (e.g., imaging optics and the selected pupil function) as well as specifications of the detector to be used with the saturation optics.

The sampled PSF may be calculated as a function of such variables as conjugate, saturation and wavelength. The sampled PSF may also be calculated based upon portions of the pupil function, such as inner and outer regions, rather then the entire pupil function.

Next, in a step 360, the sampled PSF calculated in step 340 is evaluated by comparison to a predetermined metric. For example, low intensity regions of saturated sampled PSFs and high intensity regions of unsaturated sampled PSFs may be evaluated to provide characteristics, such as compactness, symmetry, degree of similarity to sampled PSFs produced by a traditional imaging systems (i.e., without saturated optics) and the degree of uniqueness provided in the saturated sampled PSF as compared to the saturated sampled PSF produced by a traditional imaging system under saturated imaging conditions. Then, a decision 370 is made as to whether the sampled PSF evaluated in step 360 is acceptable for the given imaging system. If the answer to decision 370 is "YES" the sampled PSF is acceptable, then process 300 ends in a step 380. If the answer to decision 370 is "NO" the sampled PSF is not acceptable, then process 300 proceeds to a step 350, at which the pupil function is modified in accordance with certain parameters, and the process returns to step 340, at which the sampled PSF is calculated for the pupil function modified in step 350. The pupil function may be modified, for example, to achieve or maintain one or more of the following properties: constant phase as function of angular coordinate (i.e., Θ in polar coordinates); minimized phase discontinuities as functions of radial coordinate (i.e., R in polar coordinates); and certain characteristics of the associated sampled PSF (e.g., the sampled PSF has circular or closed contours) in both saturated and unsaturated cases.

Figure 4:
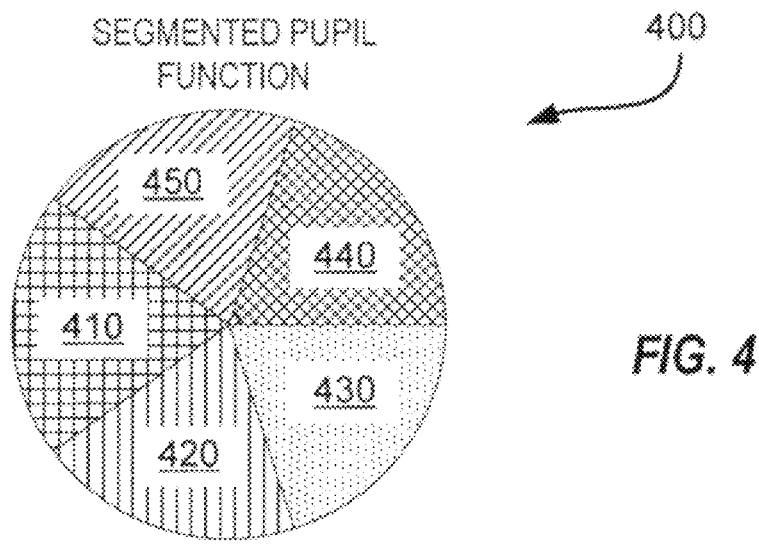
FIG. 4 is an illustration of a circular pupil function with spatially uniform segmentation, according to an embodiment.
Figure 5:
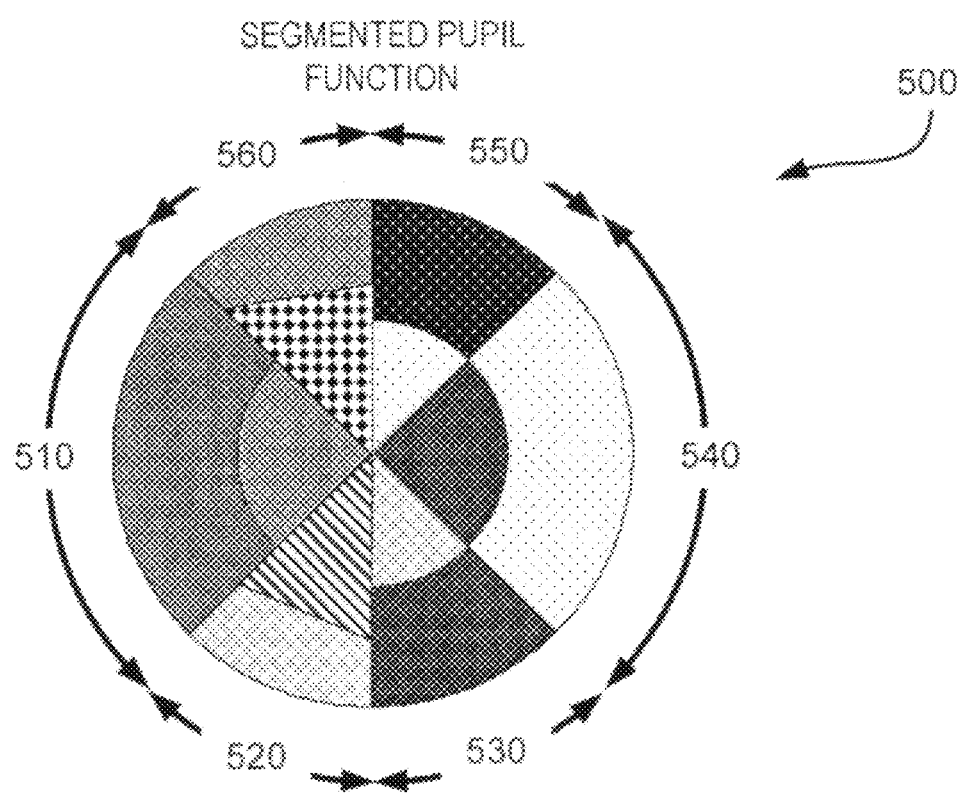
FIG. 5 is an illustration of a circular pupil function with spatially non-uniform segmentation, according to an embodiment.

One example of a suitable pupil function configuration for saturation optics is a segmented pupil function. A segmented pupil function may include any number of sectors. For example, FIG. 4 shows a circular pupil function 400 with spatially uniform segmentation into sectors 410, 420, 430, 440 and 450. Alternatively, FIG. 5 shows a circular pupil function 500 with spatially non-uniform segmentation into six sectors 510, 520, 530, 540, 550 and 560 that are further subdivided therein. The varied shadings used in FIGS. 4 and 5 are used to represent different mathematic functional forms. Each sector may have the same or different functional forms, and further include different functional forms and/or shapes within each division of the sector (e.g., sectors 520 and 560, FIG. 5).

One approach to designing a pupil function, including segmentation, is through combinations of pupil functions. For example, if $P_0$ is a first pupil function that produces a first form of a PSF, $P_1$ is a second pupil function that produces a second form of a PSF and so on, then a new pupil function may be defined as a weighted combination of a variety of pupil functions:

$$P_{new} = F(aP_1, bP_2, \ldots, zP_z), \quad \text{EQN. 1}$$

where a, b and z are parameters. Function F may include any mathematical operation such as multiplication, division, addition, division, convolution, nonlinear or combinatorial function or a combination thereof. Parameters a, b and z may be scalar or vector quantities modifying a pupil function in part or in whole. Examples herein below describe a variety of pupil function designed using this functional prescription. Saturation optics, including pupil functions defined by EQN. 1, may be combined with signal processing such that that resulting images of objects and scenes are a function of the intensity of the object and scenes.

Figure 6:
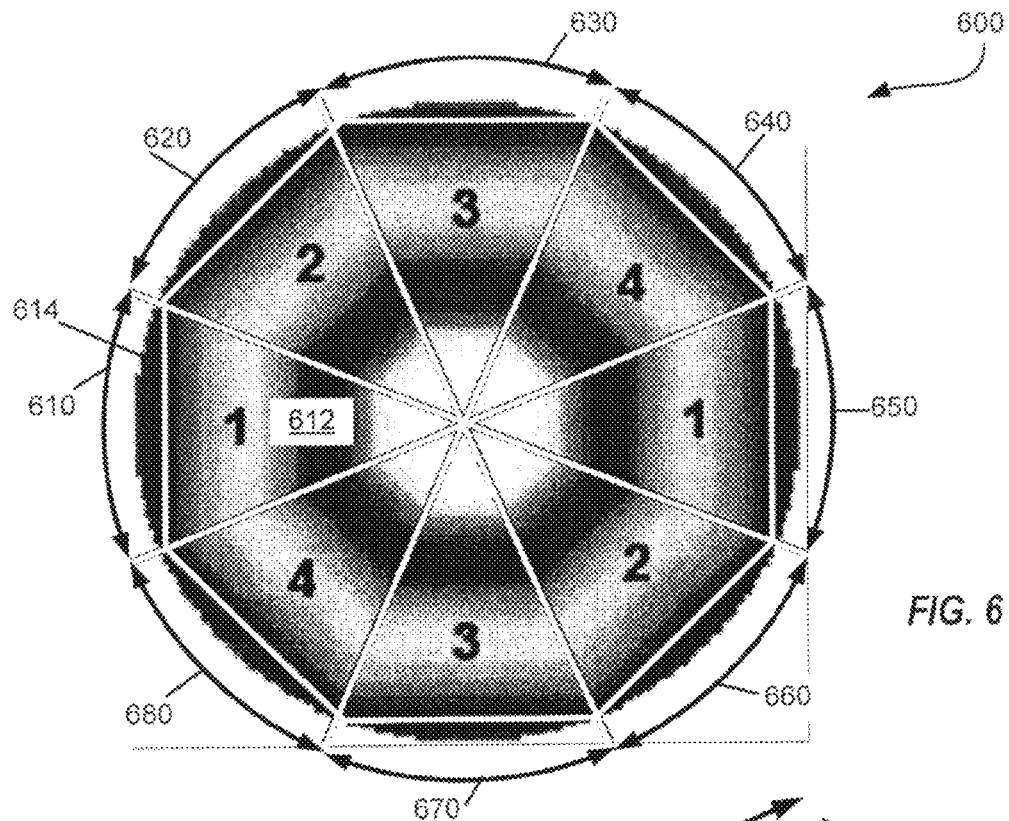
FIG. 6 is an illustration of a circular pupil function with spatially uniform segmentation of eight sectors, according to an embodiment.

FIG. 6 is an illustration of a circular pupil function 600 with spatially uniform segmentation of first through eighth sectors (610, 620, 630, 640, 650, 660, 670 and 680, respectively). Pupil function 600 is an example of a constant profile path ("CPP") form. The CPP form is constructed using a plurality of straight line segments; that is, each sector may be mathematically described along straight line segments perpendicular to a radial vector from a center of circular pupil function 600.

Each sector also has at least two regions defined by the distance from the optical axis (e.g., first sector 610 has first and second regions 612 and 614, respectively). Regions, such as first region 612, which are closest to the center of the pupil function are referred to as inner regions, and regions that are farthest from the center of the pupil function, such as second region 614, are called outer regions. For clarity, only first and second regions within first sector 610 have been labeled in FIG. 6. In one embodiment, a contour of an outer region of a pupil function designed for use with saturation optics may be generally a circular form even though the overall pupil function, especially the inner regions, has large deviation from a circular form. That is, non-circular pupil functions may be designed to generate images of saturated objects that appear to have been generated by circular pupil functions.

Returning to FIG. 6, the surface shape of each sector varies as a function of the distance from the center of the pupil function. The mathematical form of a given region (e.g., first region 612) of a sector (e.g., first sector 610) may be expressed by a one-dimensional mathematical function. For exemplary pupil function 600, all sectors are described by the same polynomial function (e.g., polynomial function 810 discussed in reference to FIG. 8). Pupil function 600 is particularly suited for use in saturation optics due to at least the following properties: 1) pupil function 600 has an even-numbered eight-fold symmetry that produces symmetric PSFs and, consequently, images that are considered more "natural" than images produced by PSFs with odd symmetry; 2) the eight-fold symmetry of pupil function 600 provides sufficient modulation and intensity for PSFs in horizontal, vertical and especially diagonal directions to which the human eye is sensitive; and 3) the eight-fold symmetry of pupil function 600 is well suited for integration with the square lattice and Bayer patterning of digital detectors.

Figure 7:
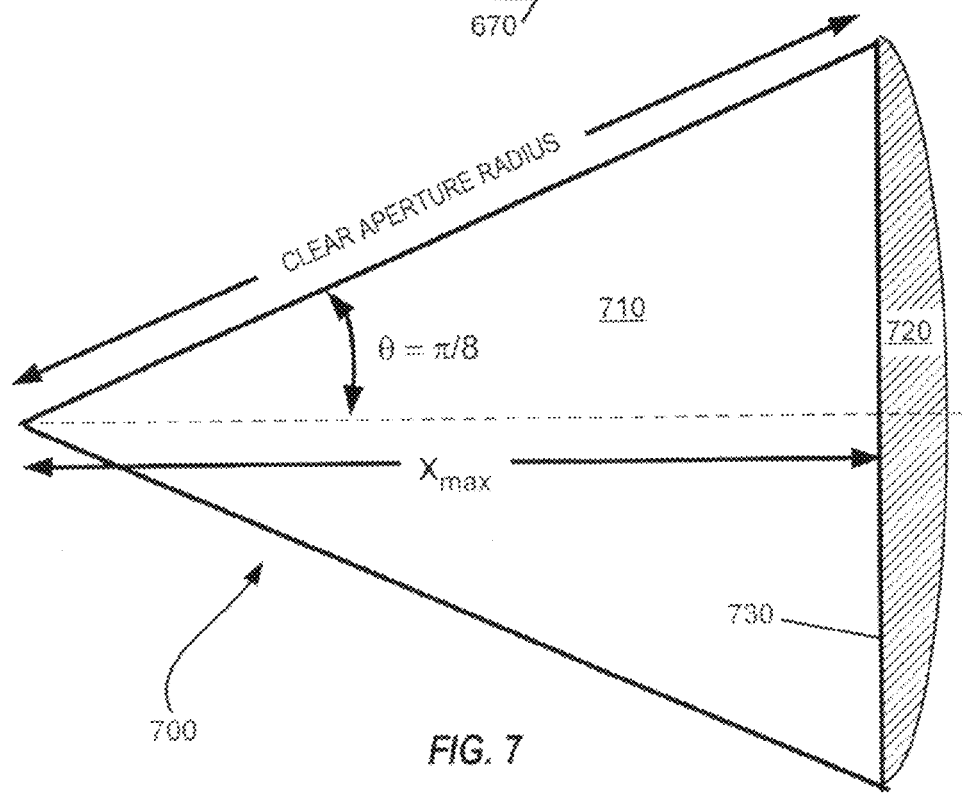
FIG. 7 is an illustration of details of one sector of the circular pupil function shown in FIG. 6.

FIG. 7 illustrates certain details of one sector of the circular pupil function shown in FIG. 6. Like the eight sectors in pupil function 600, a sector 700 includes an inner region 710 and an outer region 720. Mathematical relationships between the clear aperture radius ("CR") and the surface form height or sag are given by the following equations:

$$x_{max} = CR \cdot \cos\left(\frac{\pi}{8}\right), \quad \text{EQN. 2}$$

$$sag(x) = \sum_n \alpha_n x^{\beta_n}, \quad \text{EQN. 3}$$

$$\forall x > x_{max}, sag(x) = sag(x_{max}), \quad \text{EQN. 4}$$

wherein x is a generalized one-dimensional coordinate, $\alpha_n$ is a coefficient and $\beta_n$ is an exponent. Additionally, all sag values along a chord line 730 are defined to have the same value. While the surface sag of first region 710 is expressed by a polynomial, the form of outer region 720 may be determined by other functions.

Figure 8:
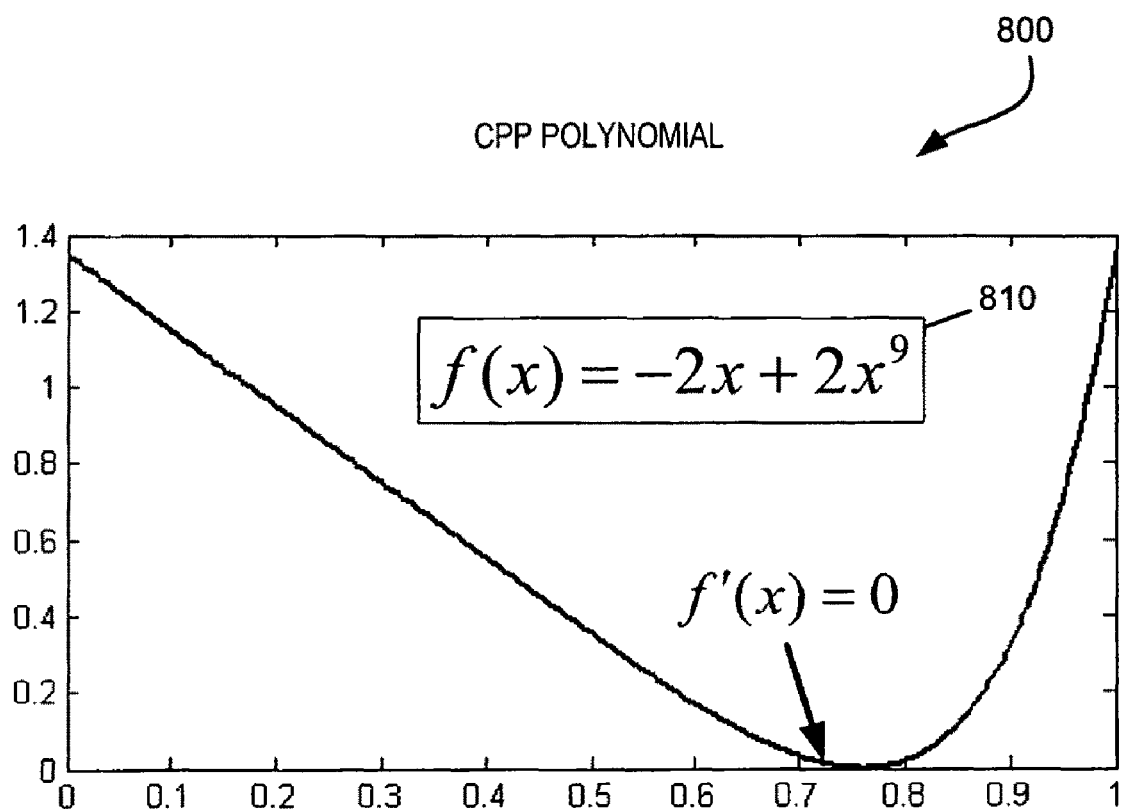
FIG. 8 shows a plot of an exemplary polynomial for defining a portion of a pupil function, according to an embodiment.

FIG. 8 shows a plot 800 of an exemplary polynomial (indicated within an inset box 810) defining a pupil function.

Polynomial 810 is an example of a CPP function. The horizontal axis of plot 800 denotes a normalized pupil coordinate (i.e., distance from the center of the pupil function) where 0 is the center of the pupil function and 1 is at the edge of the pupil function aperture. The vertical axis denotes height of the surface sag in units of wavelengths. A CPP function, such as polynomial 810, not only defines the form of a physical surface of a phase modifying optical element or elements but also, when properly scaled, defines a mathematical relationship for phase of the electromagnetic energy as a function of the pupil coordinate.

Figure 9:
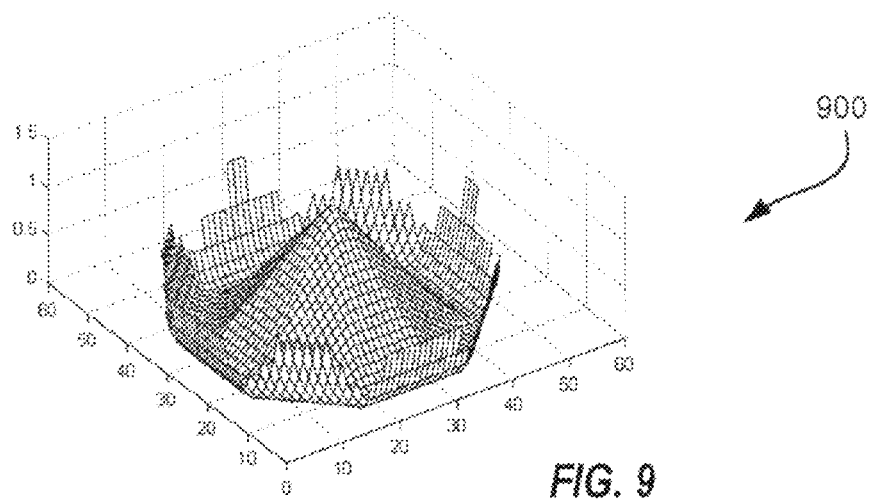
FIG. 9 shows a three-dimensional ("3D") mesh plot of an exemplary pupil function, according to an embodiment.

The mathematical prescriptions associated with FIGS. 6-8 may be combined to define a pupil function. FIG. 9 shows a 3D mesh plot 900 of an exemplary, pupil function so formed from the combination of the aforedescribed mathematical prescriptions. For mesh plot 900 and other mesh plots herein the x- and y-axes represent arbitrary spatial coordinates of the pupil functions. Vertical axes of these plots represent surface sag in wavelengths. The pupil function represented by mesh plot 900 is suitable for use in a saturation optics configuration capable of producing images with, for instance, certain identifiable characteristics.

Figure 10:
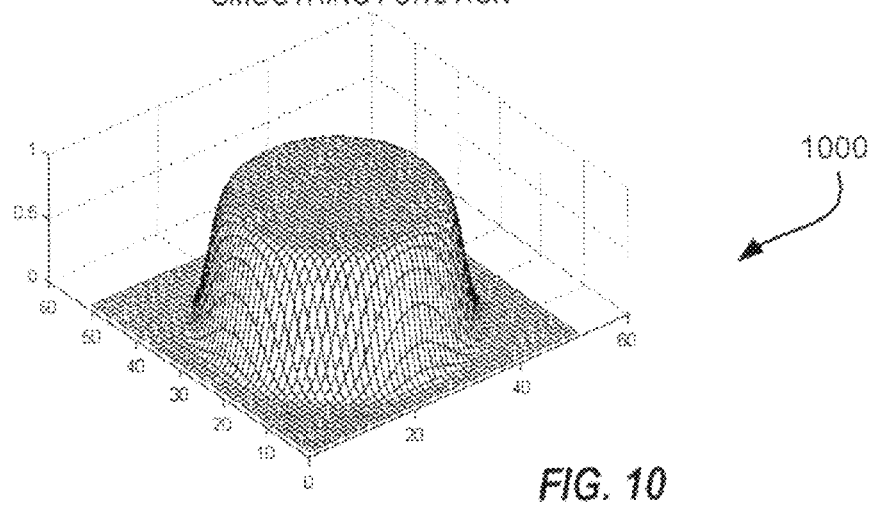
FIG. 10 shows a 3D mesh plot of an exemplary smoothing function.
Figure 11:
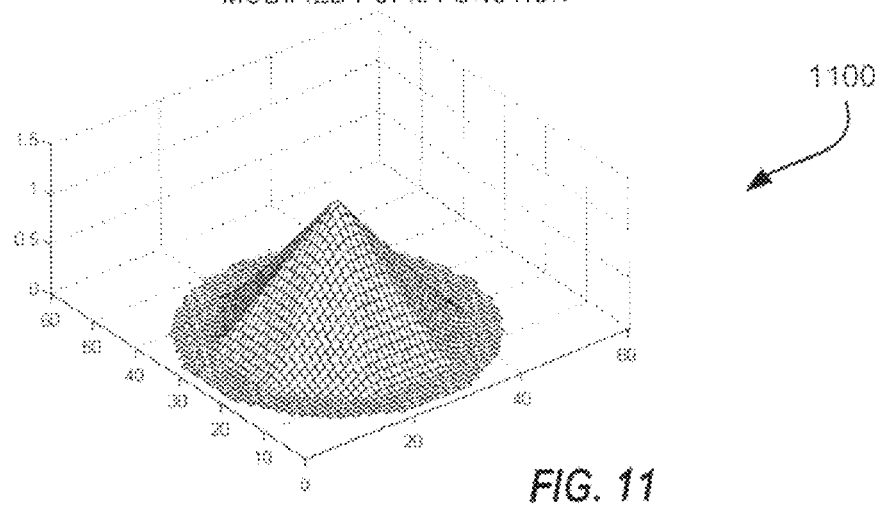
FIG. 11 shows a 3D mesh plot of a modified pupil function combining the exemplary pupil function of FIG. 9 with the exemplary smoothing function of FIG. 10, according to an embodiment.

The pupil function represented by mesh plot 900 may be modified using a smoothing function, such as shown in FIG. 10 as a 3D mesh plot 1000. Point-by-point multiplication of the pupil function with the smoothing function results in a modified pupil function, such as shown in FIG. 11 as a 3D mesh plot 1100. The modified pupil function represented by mesh plot 1100 is suitable for use in a saturation optics configuration in an embodiment.

Smoothing functions may be any function that provides desired "damping" characteristics such as, but not limited to, exponential functions, Fermi functions, Einstein functions, Gaussian functions and sigmoid functions. The smoothing function represented by 3D mesh plot 1000 is a complementary error function ("erfc"), which is an example of a sigmoid function. To form the erfc smoothing function, such as that represented by mesh plot 1000 of FIG. 10, a one-dimensional function erfc is transformed into to a rotationally symmetric cylindrical form (i.e., erfc(x)→erfc(r)).

A smoothing function may be selected in regard to its ability to provide at least some of the following advantages: 1) the pupil function becomes constant at radii beyond a zero slope value of a CPP polynomial (c.f., in plot 800, $f'(x=-0.76)=0$); 2) the pupil function is circularly symmetric at the pupil function aperture; and 3) the slope of pupil function in the radial direction is essentially a constant for all polar angles in the outer region of the pupil function. The smoothing function may be designed such that the transition between the inner and outer regions of the modified pupil function occurs in a region of constant slope or at a fixed radius from the center of the pupil function. In an embodiment, the inner regions of the original pupil function and the modified pupil function may remain essentially the same, such as shown in FIG. 11. The outer regions may be highly modified and quite different, as shown by mesh plot 1100.

Alternatively, an apodizing function for modifying the intensity of the electromagnetic energy may also be used to produce a modifying pupil function so as to produce saturation optics that modifies both phase and intensity of electromagnetic energy transmitted therethrough. That is, a pupil function for use in a saturation optics configuration may also be formed from only apodizing, intensity modifying functions.

Figure 12:
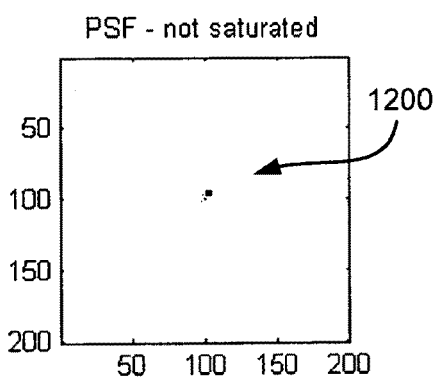
FIGS. 12-15 show images of sampled point spread functions ("PSFs") obtained with an imaging system including the pupil function of FIG. 9, according to an embodiment.
Figure 13:
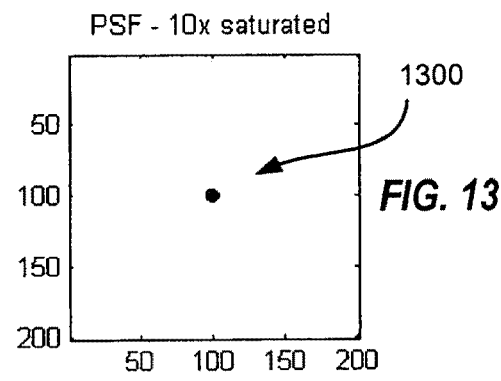
Figure 14:
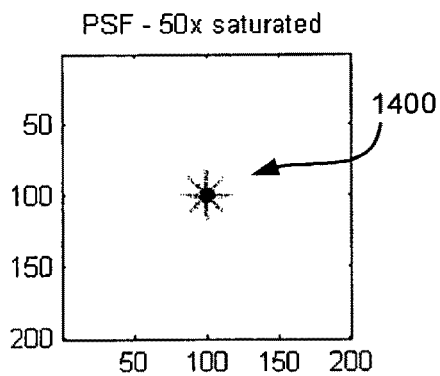
Figure 15:
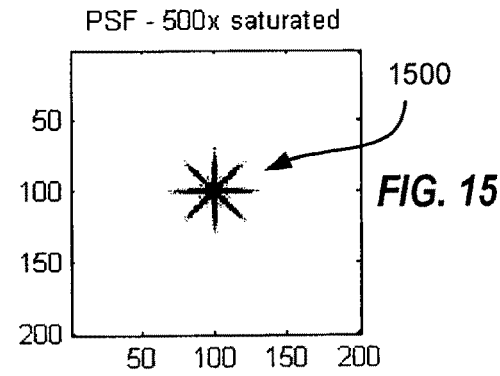
Figure 16:
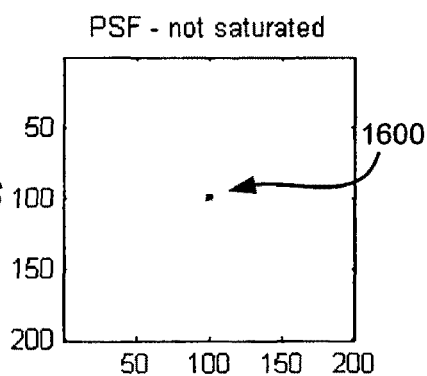
FIGS. 16-19 show images of sampled PSFs obtained with an imaging system including the modified pupil function of FIG. 11, according to an embodiment.
Figure 17:
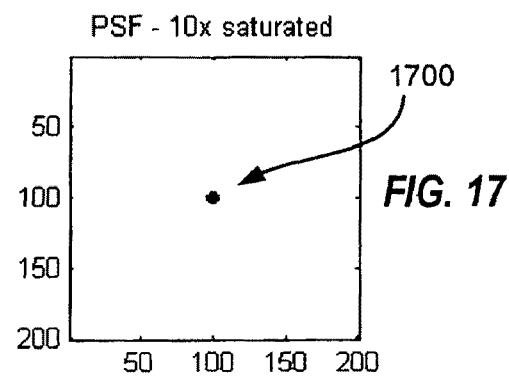
Figure 18:
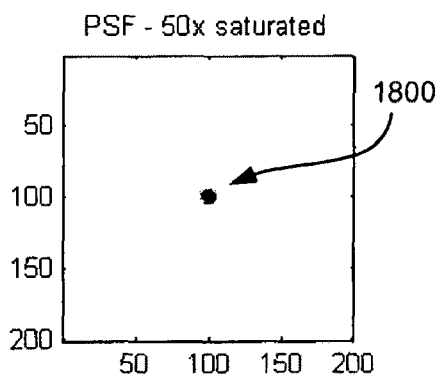
Figure 19:
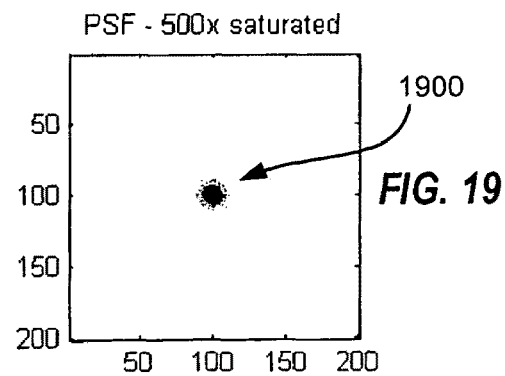

FIGS. 12-15 show plots of sampled PSFs associated with the pupil function represented by mesh plot 900 under varying degrees of saturation. The x- and y-coordinate units in these plots and subsequent sampled PSF plots herein are in units of detector pixels. FIG. 12 shows an unsaturated sampled PSF 1200, which appears very small and compact. FIG. 13 shows a 10× saturated sampled PSF 1300, which remains small and compact in appearance although larger than unsaturated sampled PSF 1200. As the illumination intensity is increased to saturation levels of 50× and 500× as shown in FIGS. 14 and 15 respectively, the saturated sampled PSFs become very different from unsaturated sampled PSF 1200. 50× and 500× saturated sampled PSFs 1400 and 1500, respectively, have star-like appearances and are very different in appearance from those formed by traditional imaging systems. While these effects are often not desirable in consumer applications and may be considered to represent poorly imaged objects, such effects may be used for specialized purposes such as watermarking and artistic imaging.

FIGS. 16-19 show plots of sampled PSFs associated with the modified pupil function represented by mesh plot 1100 of FIG. 11 under varying degrees of saturation. An unsaturated sampled PSF 1600 and a 10× saturated sampled PSF 1700 appear similar to those associated with pupil function represented by mesh plot 900. However, the sampled PSFs at greater levels of saturation (50× and 500× saturated sampled PSFs 1800 and 1900, respectively) appear quite different from 50× and 500× saturated sampled PSFs 1400 and 1500. 50× and 500× saturated sampled PSFs 1800 and 1900 appear similar to what a user would expect from those associated with traditional imaging systems. Processing of images produced by saturation optics associated with the PSFs shown in FIGS. 12-19 may alter characteristics of the images, for example, a filter may be used to enhance or at least partially remove the "star like" contours of saturated sampled PSFs 1400 and 1500 by processing.

Figure 20:
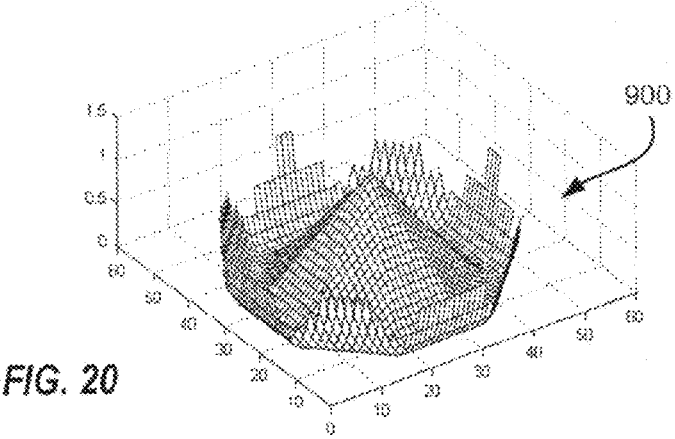
FIG. 20 shows the 3D mesh plot of FIG. 9, repeated here for convenience.
Figure 21:
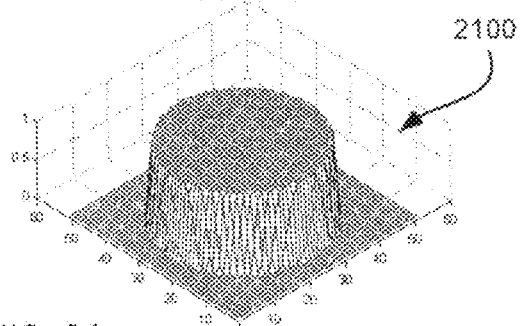
FIG. 21 shows a 3D mesh plot of an exemplary outer region masking function, according to an embodiment.
Figure 22:
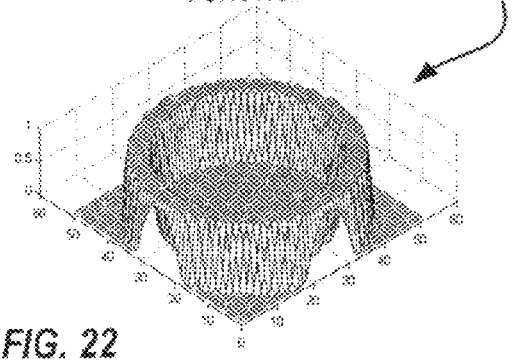
FIG. 22 shows a 3D mesh plot of an exemplary inner region masking function, according to an embodiment.
Figure 23:
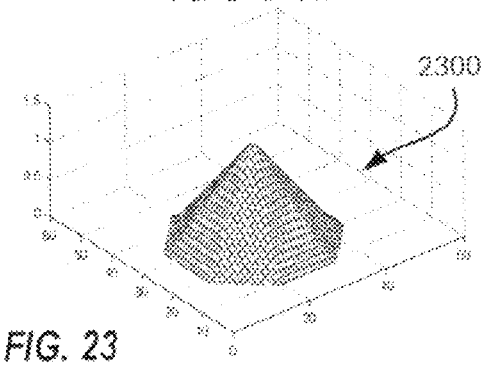
FIG. 23 shows a 3D mesh plot of a selected inner region of the pupil function of FIG. 9 resulting from point-by-point multiplication of the pupil function of FIG. 9 with the outer region masking function shown in FIG. 21, according to an embodiment.
Figure 24:
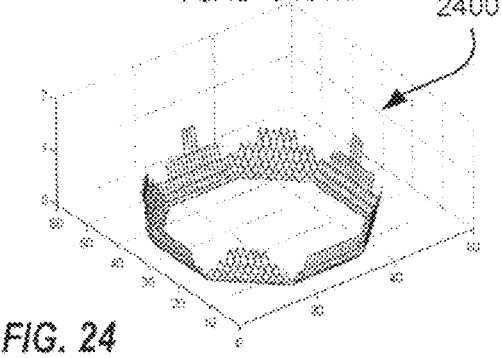
FIG. 24 shows a 3D mesh plot of a selected outer region of the pupil function of FIG. 9 resulting from point-by-point multiplication of the pupil function of FIG. 9 with the inner region masking function shown in FIG. 22, according to an embodiment.

FIGS. 20-24 show an exemplary decomposition of a pupil function into an inner region and an outer region. FIG. 20 shows mesh plot 900 of the pupil function of FIG. 9, repeated here for convenience. FIGS. 21 and 22 show 3D mesh plots 2100 and 2200, respectively, of an exemplary inner region masking function and an outer region masking function. A common radial boundary for the regions has been defined, for this example, to be at a normalized radius of r=0.77. This normalized radius value boundary has been chosen such that the slope of the radial CPP polynomial of FIG. 8 is nearly zero. Each masking function has a value of one where that portion of the pupil function is to be selected and a value of zero where the pupil function is not to be selected. FIGS. 23 and 24 show 3D mesh plots 2300 and 2400, respectively, of selected inner and outer region pupil functions that result from point-by-point multiplication of pupil function shown in FIG. 20 with the masking functions plotted in FIGS. 21 and 22.

Figure 26:
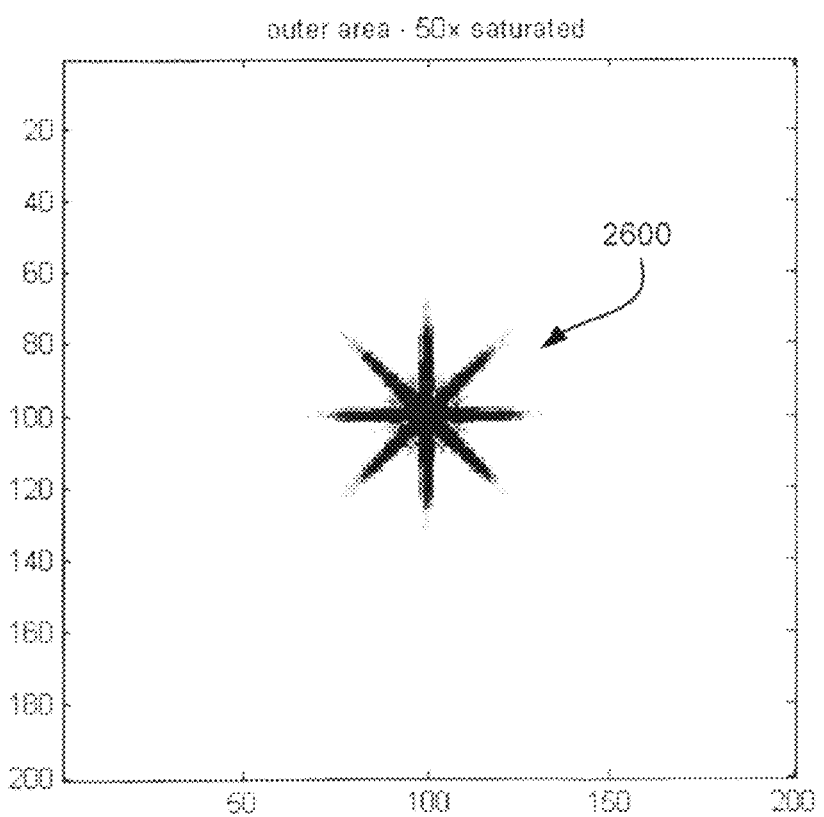
FIG. 26 shows a plot of a saturated sampled PSF obtained with an imaging system including with the selected outer region of the pupil function as shown in FIG. 24.

FIGS. 25 and 26 show plots of saturated sampled PSFs associated with selected inner region and outer region pupil functions of FIGS. 23 and 24, respectively. The x- and y-axis units are in units of detector pixels. A saturated sampled PSF 2500, associated with the inner region pupil function of FIG. 25, is as compact as an unsaturated sampled PSF (e.g., unsaturated sampled PSFs 1200 and 1600 of FIGS. 12 and 16, respectively), while a saturated sampled PSF 2600, associated with the outer region pupil function of FIG. 26, exhibits a large star-like shape. The relative size of saturated sampled PSF 2500 is also much smaller than that of saturated sampled PSF 2600. Therefore, it appears that the outer region pupil function dominates the effects on the PSF of the pupil function as a whole.

Figure 27:
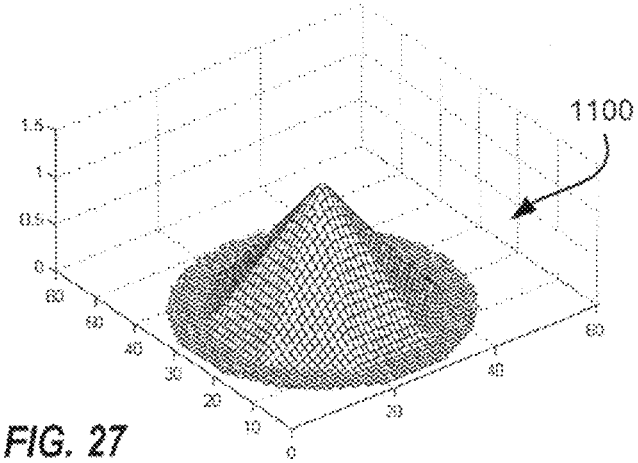
FIG. 27 shows the 3D mesh plot of FIG. 11, repeated here for convenience.
Figure 28:
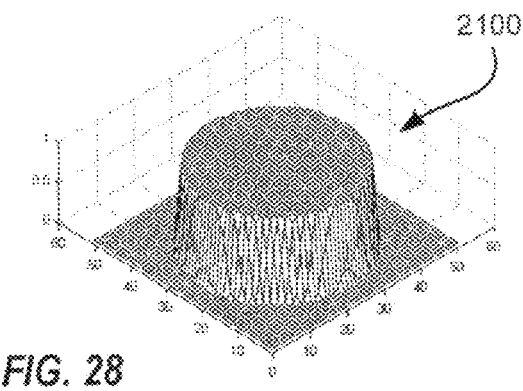
FIG. 28 shows the 3D mesh plot of FIG. 21, repeated here for convenience.
Figure 29:
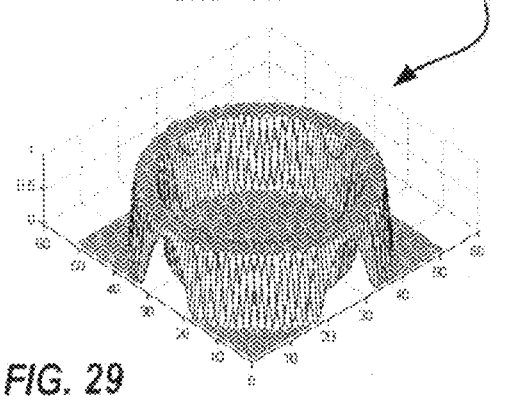
FIG. 29 shows the 3D mesh plot of FIG. 22, repeated here for convenience.
Figure 30:
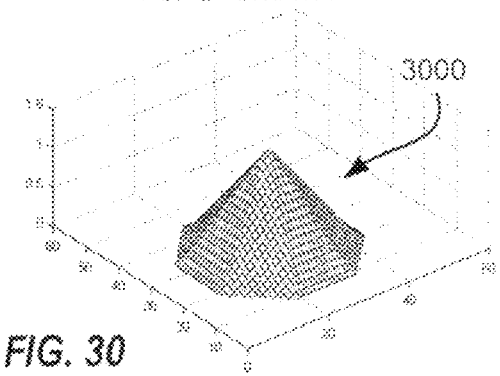
FIG. 30 shows a 3D mesh plot of a selected inner region resulting from point-by-point multiplication of the pupil function of FIG. 11 with the outer region masking function of FIG. 21, according to an embodiment.
Figure 31:
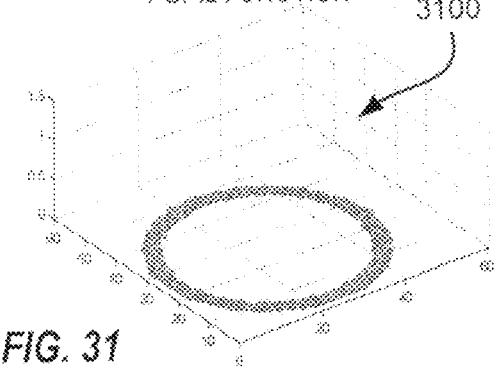
FIG. 31 shows a 3D mesh plot of a selected outer region resulting from point-by-point multiplication of the pupil function of FIG. 11 with the inner region masking function of FIG. 22, according to an embodiment.

FIGS. 27-31 show an exemplary decomposition of the modified pupil function, as represented by mesh plot 1100 of FIG. 11, into inner and outer regions. FIG. 27 shows mesh plot 1100 of the modified pupil function of FIG. 11, repeated here for convenience. FIGS. 28 and 29 show the 3D mesh plots 2100 and 2200, respectively, of the masking functions of FIGS. 21 and 22, also repeated here for convenience. FIGS. 30 and 31 show 3D mesh plots 3000 and 3100, respectively, of the selected inner and outer region pupil functions that result from point-by-point multiplication of pupil function of FIG. 27 with the masking functions plotted in FIGS. 28 and 29.

Figure 32:
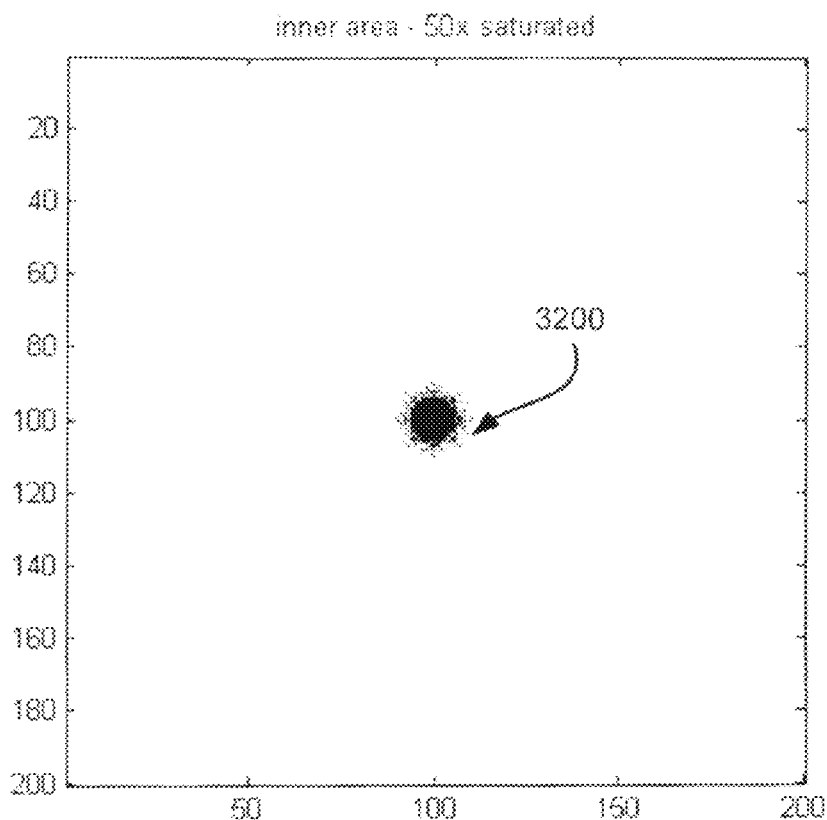
FIG. 32 shows a plot of a saturated sampled PSF obtained with an imaging system including the selected inner region of the pupil function as shown in FIG. 30.
Figure 33:
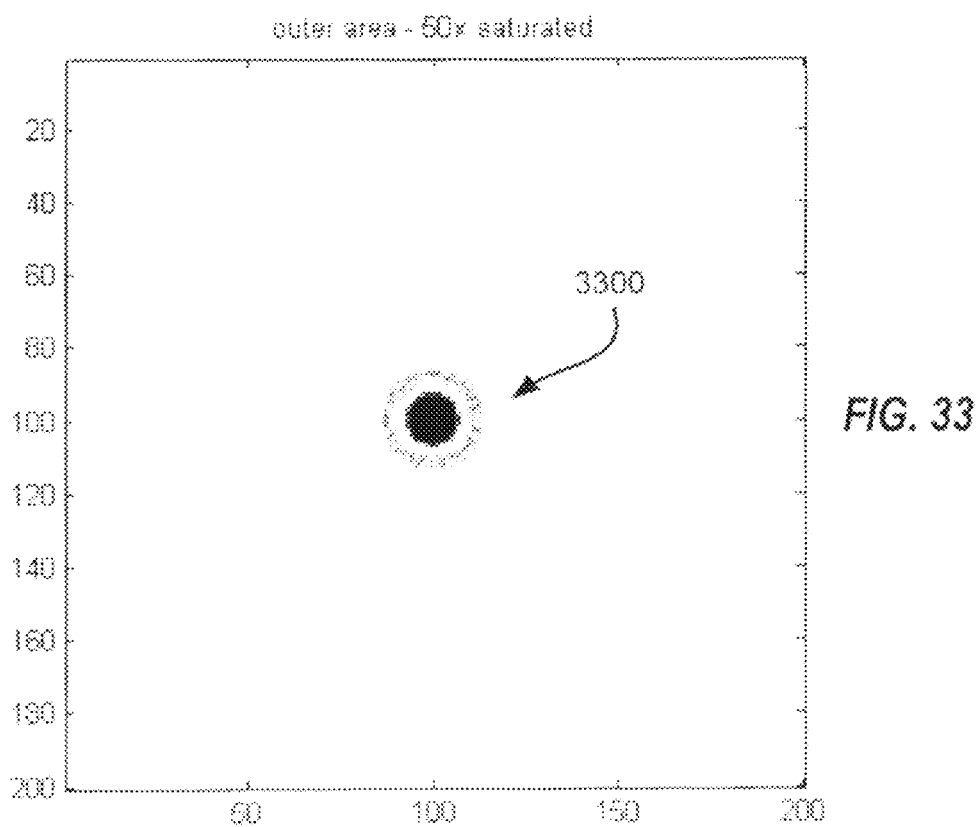
FIG. 33 shows a plot of a saturated sampled PSF obtained with an imaging system including the selected outer region of the pupil function as shown in FIG. 31.

FIGS. 32 and 33 show plots of saturated sampled PSFs associated with selected inner and outer region pupil functions of FIGS. 32 and 33, respectively. A saturated sampled PSF 3200, associated with the inner region pupil function of FIG. 32, is as compact as an unsaturated sampled PSF and substantially the same as that of FIG. 25. Saturated sampled PSF 3300 associated with the outer region pupil function of FIG. 31, is quite different from that of FIG. 26. As is apparent in FIG. 33, saturated sampled PSF 3300 associated with the outer region pupil function appears circular and closed; that is, saturated sampled PSF 3300 appears to be the type of contour that users of traditional imaging systems have come to expect under saturated imaging conditions. Therefore, tailoring the outer region pupil function appears to have a direct effect on the shape and size of the saturated sampled PSF associated therewith.

It is recognized herein that the effect of the pupil function under unsaturated and saturated imaging conditions differ significantly. Therefore, the design goals for saturation optics may include, for example, the ability to: 1) generate suitable forms and proportions of $P_0$ and $P_1$ such that sufficient image quality is provided when the system is not saturated; and 2) generate suitable forms of $P_1$ such that when the imaging system is saturated, the resulting saturated image is as desired. In the case of a pupil function with a circular aperture, for instance, it may be desirable that the slope of the surface around the periphery of the aperture remain constant as a function of field angle and that there are no phase discontinuities in the radial direction. For non-circular apertures, non-constant slopes at the periphery may be defined so that a saturated sampled image appears similar to that formed by a traditional imaging system. For identification and/or artistic purposes these design goal may be greatly modified. Such design goals may be used as metrics in step 360 of process 300 of FIG. 3 to evaluate the sampled PSF.

Figure 36:
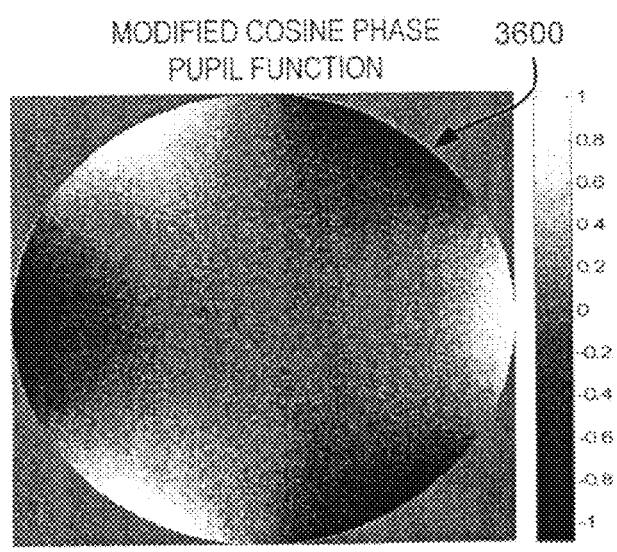
FIG. 36 shows a grayscale image of the sum of the cosine phase and random phase pupil functions respectively shown in FIGS. 34 and 35.

Another method for constructing a composite pupil function is by addition of two or more full pupil functions. FIGS. 34-36 show an example of additive construction of a pupil function. FIG. 34 shows a contour plot 3400 of an exemplary pupil function $P_1$, based upon the mathematical form: $R^3 \cos(3\Theta)$, where R is a normalized radial pupil coordinate and $\Theta$ is an angular pupil coordinate. Pupil function $P_1$ has a peak-to-valley wavefront variation of approximately 1.3 waves.

FIG. 35 shows a grayscale image 3500 of a statistically designed pupil function $P_2$ with a peak to valley wavefront variation of approximately 0.35 waves. The actual form of this pupil function is statistically and spatially correlated about the pupil function. The design process involves modeling the values across the pupil function as Gaussian random variables of unit variance and then convolving the two dimensional ("2D") random spatial variables with a second order Gaussian function of unit volume. The resulting correlated random variables, including amplitude scaling, become the values for pupil function $P_2$. This type of design process is seen to be generally similar to that used to design diffractive phase components. For example, bar code scanners may use such diffractive components to produce alignment marks with projected illumination systems. Also, novelty business cards may be embossed with simple diffractive optics to produce grayscale images of keyboards and general scenes when illuminated by coherent electromagnetic energy. Techniques to design such diffractive optics are adaptable for use in the design of components for saturation optics. Pupil functions $P_1$ and $P_2$ may added to form saturation optics pupil function $P_1+P_2$, represented by a grayscale image 3600 shown in FIG. 36.

Figure 37:
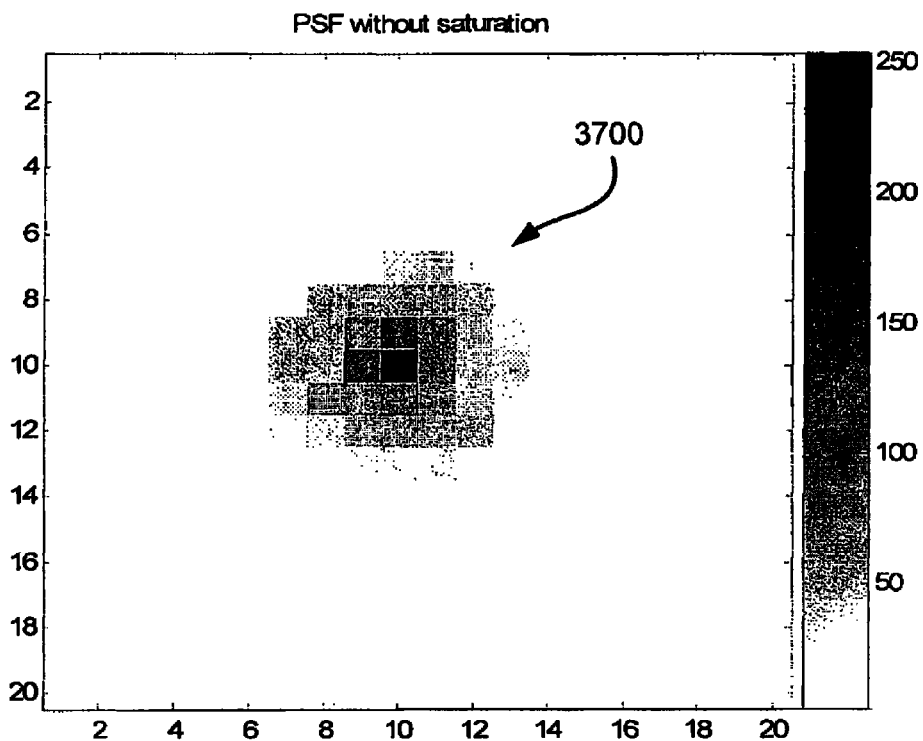
FIG. 37 shows a grayscale image of an unsaturated sampled PSF obtained with an imaging system including the pupil function of FIG. 34.
Figure 38:
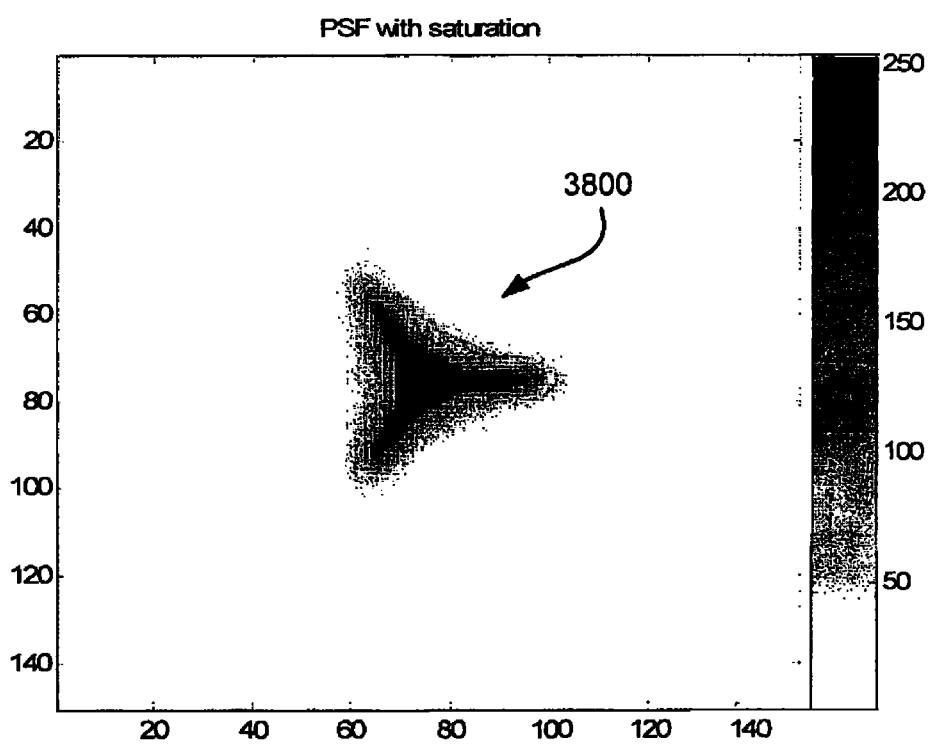
FIG. 38 shows a grayscale image of a saturated sampled PSF obtained with an imaging system including the pupil function of FIG. 34.

FIG. 37 shows a grayscale image of an unsaturated sampled PSF 3700 associated with pupil function $P_1$ of FIG. 34. Unsaturated sampled PSF 3700 is generally compact and nearly rotationally symmetric. FIG. 38 shows a grayscale image of a saturated sampled PSF 3800 associated with pupil function $P_1$ of FIG. 34. Saturated sampled PSF 3800 shows non-rotationally symmetric characteristics. As discussed above, non-rotationally symmetric characteristics may be considered less pleasing or of lower image quality when compared to a saturated sampled PSF produced by a traditional imaging system. Alternatively, the non-rotationally symmetric characteristics may be advantageously used as identification marks.

Figure 39:
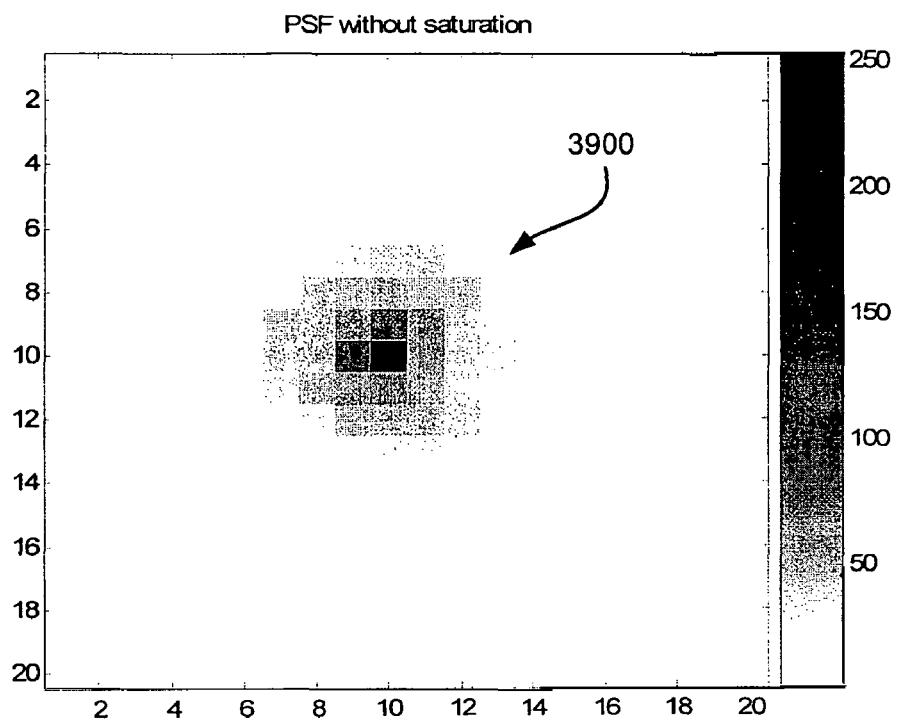
FIG. 39 shows a grayscale image of an unsaturated sampled PSF obtained with an imaging system including the pupil function of FIG. 36.
Figure 40:
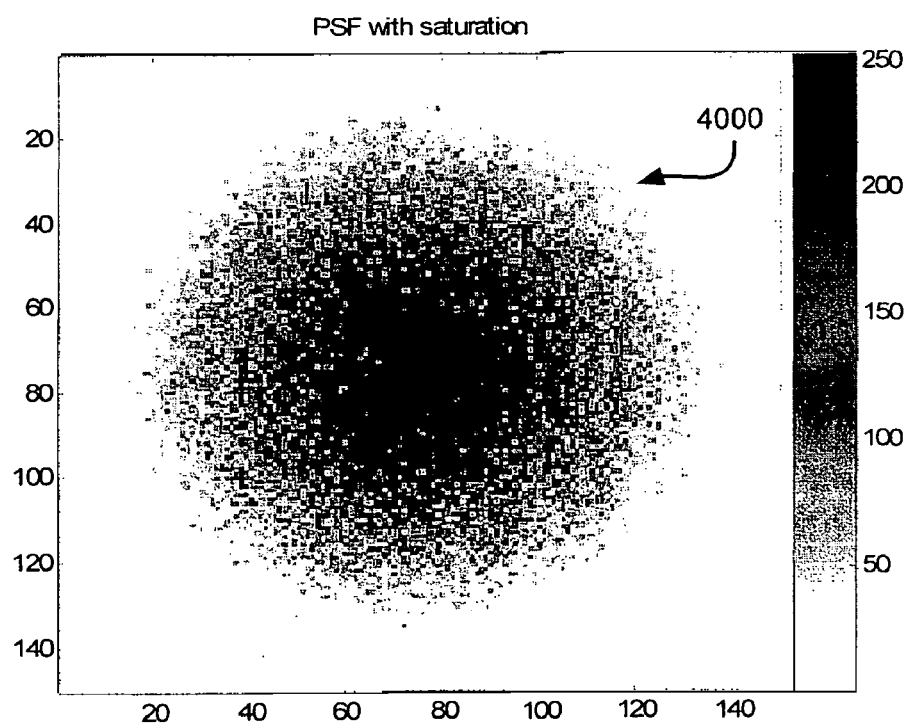
FIG. 40 shows a grayscale image of a saturated sampled PSF obtained with an imaging system including the pupil function of FIG. 36.

A grayscale image of an unsaturated sampled PSF 3900 associated with pupil function $P_1+P_2$ of FIG. 36 is shown in FIG. 39. A comparison of FIGS. 37 and 39 shows that unsaturated sampled PSFs 3700 and 3900 are very similar. FIG. 40 shows a grayscale image of a saturated sampled PSF 4000 associated with pupil function $P_1+P_2$ of FIG. 36. A comparison of FIGS. 38 and 40 shows that saturated sampled PSFs 3800 and 4000 are very different; that is, while saturated PSF 3800 exhibited non-rotationally symmetric characteristics, saturated PSF 4000 of FIG. 40 is generally circularly symmetric and is similar to a saturated PSF produced by a traditional imaging system.

The sampled PSFs may be processed by a signal processor, such as signal processor 170 of FIG. 1, so as to alter their characteristics. For example, a filter may be used to either enhance or at least partially remove the three-fold symmetric contours of saturated sampled PSF 3800 or a filter may be used to increase the compactness (i.e., decrease the spatial extent) of unsaturated sampled PSFs 3700 and 3900 and saturated sampled PSF 4000.

Instead of designing pupil function $P_2$ of FIG. 35 to form a Gaussian-like sampled PSF response from the imaging system, the pupil function may be tailored to form an image that represents text (such as the text "CDM" shown in FIG. 2) or, as another example, a model number of a given imaging system. When such a pupil is interrogated with a high illumination intensity source, such as a laser, the image produced may then act as an identifier of the type of imaging system. For instance, this effect may be a function of the location of the image on the image plane by placing function $P_2$ in a region of imaging system that is illuminated by only off-axis illumination.

Certain changes may be made in the imaging system and processes described herein without departing from the scope thereof. For example, although the pupil functions described herein consider phase only for designing saturation optics; intensity or both phase and intensity may be used. Furthermore, although some of the described embodiments note the use of two components for forming a saturation optics pupil function, more than two may be readily used. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An imaging system for imaging electromagnetic energy, comprising:
    a detector for receiving the electromagnetic energy and generating sampled data in accordance with the electromagnetic energy so received, the sampled data comprising a sampled point spread function ("PSF"), the detector being characterized by a threshold point such that the sampled data is in one of two states: i) below threshold, when the intensity of the electromagnetic energy so received is less than the threshold point; and ii) above threshold, when the intensity of the electromagnetic energy is greater than the threshold point; and
    saturation optics for providing a characteristic of the sampled data,
    wherein a characteristic of the sampled data when below threshold is different from the characteristic of the sampled data when above threshold.

2. The imaging system of claim 1, wherein the sampled PSF is saturated when above threshold.

3. The imaging system of claim 2, wherein the sampled PSF exhibits one of a circular contour and a closed contour when above threshold.

4. The imaging system of claim 2, the imaging system being characterized by a field of view, wherein the sampled PSF, when saturated, exhibits different characteristics for high illumination intensity objects located within the field of view and those located outside of the field of view.

5. The imaging system of claim 2, the imaging system being characterized by a field of view, wherein the sampled PSF, when saturated, exhibits different characteristics for high illumination intensity objects located at different locations within the field of view.

6. The imaging system of claim 5, the imaging system including stray electromagnetic energy present therein, further comprising a signal processor for modifying a portion of the sampled data associated with the stray electromagnetic energy in accordance with the sampled PSF.

7. The imaging system of claim 1, further comprising a signal processor for processing the sampled data in accordance with the sampled PSF.

8. The imaging system of claim 1, wherein the saturation optics comprise an arrangement of segments providing a multi-fold symmetry.

9. The imaging system of claim 8, wherein each one of the segments is characterized by a surface sag describable by a one dimensional function along a straight line perpendicular to a radial vector from a center of the saturation optics.

10. The imaging system of claim 9, wherein the one dimensional function comprises:

$$sag(x) = \sum_n \alpha_n x^{\beta_n},$$

where $$x_{max} = (\text{clear aperture radius}) \cdot \cos\left(\frac{\pi}{8}\right)$$

and $$sag(x) = sag(x_{max}) \text{ for } x > x_{max}.$$

11. The imaging system of claim 10, wherein the one dimensional function comprises:

$$sag(x) = -2x + 2x^9.$$

12. The imaging system of claim 8, wherein each of the segments further comprises at least inner and outer regions having different surface profiles.

13. The imaging system of claim 12, wherein the outer regions of the plurality of segments are uniform and constant.

14. The imaging system of claim 12, wherein the outer regions of the plurality of segments are modified with a smoothing function.

15. The imaging system of claim 14, wherein the smoothing function comprises a sigmoid.

16. The imaging system of claim 15, wherein the sigmoid comprises a complementary error function ("erfc").

17. The imaging system of claim 8, wherein the arrangement comprises segments that are uniform in size.

18. The imaging system of claim 17, wherein the arrangement comprises eight segments exhibiting an eight-fold symmetry.

19. The imaging system of claim 8, wherein at least one of the segments of the arrangement is different in size compared to other segments in the arrangement.

20. The imaging system of claim 1, wherein the sampled PSF when the data is above threshold exhibits a predetermined pattern.

21. The imaging system of claim 20, wherein the predetermined pattern comprises one of a star pattern and a digital watermark.

22. The imaging system of claim 21, wherein the digital watermark is viewable by illuminating the imaging system with off-axis and out-of-field illumination.

23. An imaging system for imaging electromagnetic energy, comprising:
    a detector for receiving the electromagnetic energy and generating sampled data in accordance with the electromagnetic energy so received, the detector being characterized by a threshold point such that the sampled data is in one of two states: i) below threshold, when the intensity of the electromagnetic energy so received is less than the threshold point; and ii) above threshold, when the intensity of the electromagnetic energy is greater than the threshold point; and
    saturation optics for providing a characteristic of the sampled data, the saturation optics comprising imaging optics for directing the electromagnetic energy toward the detector and phase modifying optics for modifying a wavefront of the electromagnetic energy,
    wherein a characteristic of the sampled data when below threshold is different from the characteristic of the sampled data when above threshold.

24. The imaging system of claim 23, wherein the phase modifying optics are integrally formed with the imaging optics.

25. Phase modifying optics for use in an imaging system, comprising:
    a constant profile path form including a plurality of sectors, each of the plurality of sectors comprising a surface sag ("sag(x)") describable by a one dimensional mathematical function along a mid-line corresponding to a radial vector, which radial vector has an origin x =0 at a center of a circular pupil function and passes through a midpoint of a sector chord line at x =$x_{max}$, and a plurality of straight line segments perpendicular to the mid-line and having a value equal to sag(x) therealong, wherein the one dimensional mathematical function comprises:

$$sag(x) = -2x + 2x^9,$$

where $x_{max} = $ (clear aperture radius) $\cdot \cos\left(\frac{\pi}{8}\right)$ and $$sag(x) = sag(x_{max}) \text{ for } x > x_{max}.$$

26. Phase modifying optics of claim 25, wherein each of the plurality of sectors further comprises at least inner and outer regions having different surface profiles.

27. Phase modifying optics of claim 26 wherein the outer regions of the plurality of sectors are uniform and constant.

28. Phase modifying optics of claim 25, further comprising a modification of the constant profile path form with a smoothing function.

29. Phase modifying optics of claim 28, wherein the smoothing function comprises a sigmoid.

30. Phase modifying optics of claim 29, wherein the sigmoid comprises a complementary error function ("erfc").

31. Phase modifying optics of claim 25, wherein the plurality of sectors are same in size.

32. Phase modifying optics of claim 25, wherein at least one of the plurality of sectors is different in size compared to other ones of the plurality of sectors.

33. A method for designing a pupil function for use in an imaging system, comprising:
    selecting a pupil function;
    calculating a sampled PSF, taking into account characteristics of the imaging system and the pupil function;
    evaluating the sampled PSF in accordance with a selected metric; and
    if the sampled PSF does not conform within the selected metric, then
    modifying the pupil function, using a set of parameter modifications, and
    repeating the evaluating and modifying of the pupil function until the sampled PSF conforms within the selected metric.

* * * * *